(12) United States Patent
Masterson et al.

(10) Patent No.: US 6,322,127 B1
(45) Date of Patent: *Nov. 27, 2001

(54) TRACTOR TRAILER COVER ASSEMBLY

(76) Inventors: Patrick Masterson; Mark Newman, both of Box 268, North Hatley, Quebec (CA), J0B 2C0

( * ) Notice: Subject to any disclaimer, the term of this patent is extended or adjusted under 35 U.S.C. 154(b) by 0 days.

This patent is subject to a terminal disclaimer.

(21) Appl. No.: 09/627,229

(22) Filed: Jul. 27, 2000

Related U.S. Application Data

(63) Continuation of application No. 09/231,656, filed on Jan. 15, 1999, now abandoned, which is a continuation-in-part of application No. 08/826,668, filed on Apr. 7, 1997, now Pat. No. 5,890,757.

(30) Foreign Application Priority Data

Apr. 7, 1998 (CA) .................................................. 2234302

(51) Int. Cl.⁷ ...................................................... B60P 7/02
(52) U.S. Cl. ............... 296/100.02; 296/100; 296/100.01; 296/100.04; 296/26.04
(58) Field of Search ............................. 296/100, 100.01, 296/100.02, 100.03, 100.04, 100.05, 26.04, 26.05, 26.01, 43, 36, 181; 414/498

(56) References Cited

U.S. PATENT DOCUMENTS

| | | |
|---|---|---|
| 1,861,906 | 6/1932 | Bradburn . |
| 2,797,124 | 6/1957 | Hauptli . |
| 2,949,867 | 8/1960 | Ramsey . |
| 3,694,024 | 9/1972 | Linville . |
| 3,802,732 | 4/1974 | McKee . |
| 4,269,443 | 5/1981 | Farmer . |
| 4,392,682 | 7/1983 | Norkus, Jr. . |
| 4,815,787 | 3/1989 | Hale . |
| 5,417,540 | 5/1995 | Cox . |
| 5,486,031 | 1/1996 | Ronchetti et al. . |
| 5,593,272 | 1/1997 | Green . |
| 5,692,794 | 12/1997 | Kelsch et al. . |

Primary Examiner—Stephen T. Gordon
Assistant Examiner—Kiran B. Patel
(74) Attorney, Agent, or Firm—James E. Gastle

(57) ABSTRACT

Disclosed herein is a cover for a semi-trailer vehicle having a cargo support surface bordered by a pair of longitudinal edge regions. The cover has a roof and a pair of side walls forming a cargo receiving passage there between; each of the pair of side walls terminating at a longitudinal free edge region to expose the cargo receiving passage to the cargo support surface. A lifting arrangement lifts the cover between a first position above the cargo support surface and a second position in abutment with the cargo support surface. Couplings removably couple each of the longitudinal free edge regions to a corresponding longitudinal edge region.

9 Claims, 17 Drawing Sheets

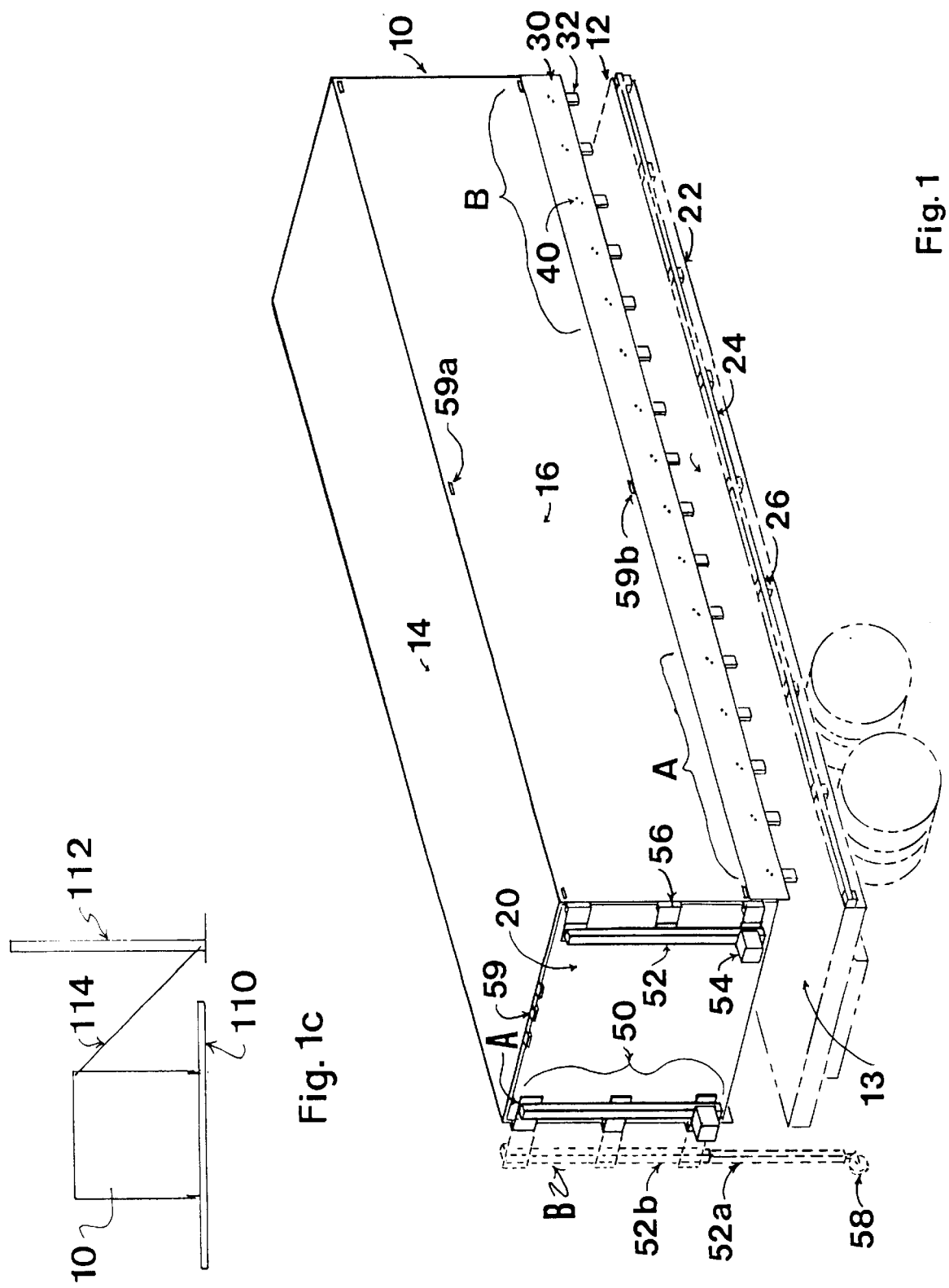

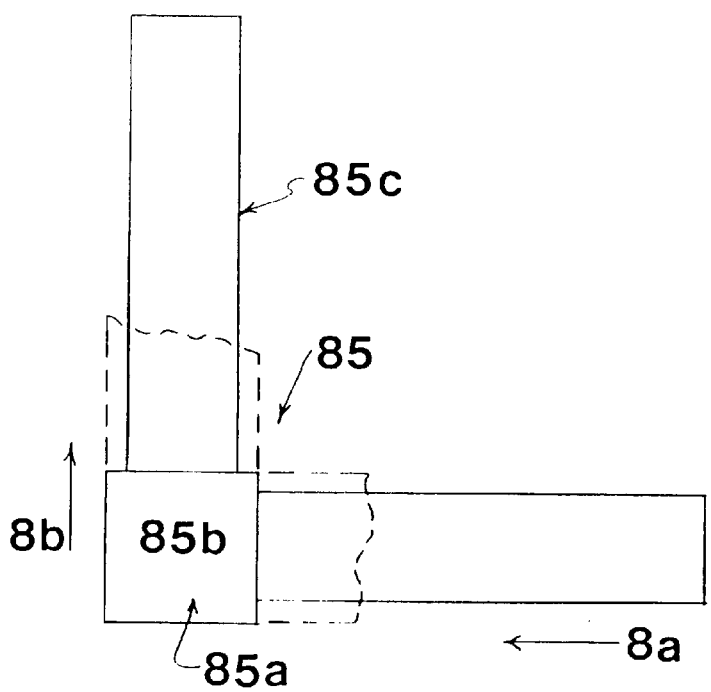
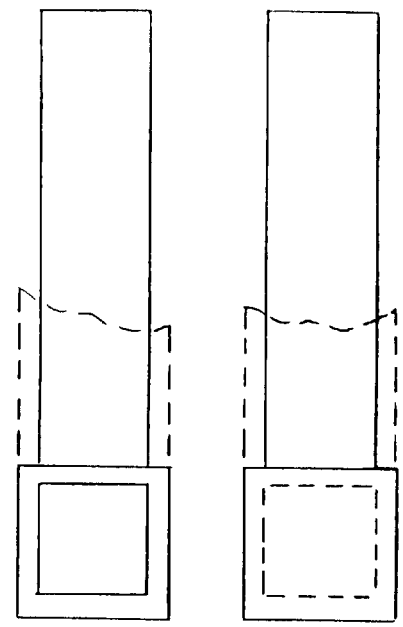
Fig. 8          Fig. 8a     Fig. 8b
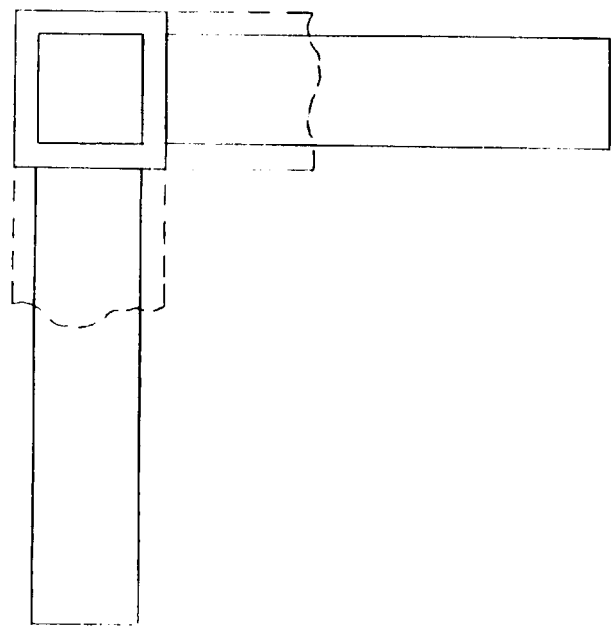
Fig. 9

TRACTOR TRAILER COVER ASSEMBLY

REFERENCE TO APPLICATION

This a continuation of U.S. application Ser. No. 09/231,656 filed Jan. 15, 1999, now abandoned, which itself is a continuation-in-part of application Ser. No. 08/826,668 filed Apr. 7, 1997, now U.S. Pat. No. 5,890,757. The subject matter of these two applications is incorporated herein by reference.

BACKGROUND OF THE INVENTION

1. Field of the Invention

The present invention relates to semi-trailer vehicles and more particularly to methods of covering cargo on semi-trailers, such as 'flat deck' trailers.

2. Description of the Related Art

Most durable goods and raw materials are shipped by semi-trailer vehicles on the public highways of the developed world. These vehicles are known to have a tractor unit and a semi-trailer unit, the trailer coming in a variety of arrangements depending on its intended cargo. The trailer, for example, may be a van type with a substantially weather proof interior cargo hold, or a flat bed or flat deck trailer. In the latter case, the cargo must be covered in some fashion to protect the cargo from the elements. Conventionally this is done by flexible tarps wrapped around the cargo and fastened in place with rope or elastic fastener materials.

Other covers for the cargo on a flat deck trailer are sold under the tradenames "ROLL BACK" or "ROLL TITE". These covers are individually installed and permanently fitted to each individual flat deck trailer. This is done by modifying the trailer by removing the 'rub rail' from the periphery of the trailer. Other tarping arrangements include rack and tarp arrangements which have modified posts placed along the periphery of the flat deck trailer to position plywood sheets in an upright position. The tarp is then stretched over the cargo or, in the case of the rack and tarp arrangements, stretched over the space between the sheets to provide a measure of weather protection for the cargo.

Though tarps arrangements such as this are generally satisfactory, they do have some inherent weaknesses. For example, the tarps are relatively heavy and difficult to handle when manually stretched over the cargo. They tend to rip or simply become unfastened due to the buffeting wind forces exerted on the tarp during use. In either case, the cargo can become exposed to the elements and therefore be damaged. Tarped flat deck trailers also do not have important clearance lighting, thus increasing the risk of traffic accidents.

It is an object of the present invention to provide obviate these disadvantages.

SUMMARY OF THE INVENTION

Briefly stated, the invention involves a cover for a semi-trailer vehicle having a cargo support surface bordered by a pair of longitudinal edge regions, the cover comprising a roof and a pair of side walls forming a cargo receiving passage there between; each of the pair of side walls terminating at a longitudinal free edge region to expose the cargo receiving passage to the cargo support surface, and coupling means for removably coupling each of the longitudinal free edge regions to a corresponding longitudinal edge region.

In one embodiment, the cover includes lifting means for lifting the cover between a first position above the cargo support surface and a second position in abutment with the cargo support surface.

In another aspect of the present invention, there is provided a method of covering cargo on a semi-trailer vehicle having a cargo support surface bordered by a pair of longitudinal edge regions, comprising the steps of:
providing a cover with a roof and a pair of side walls forming a cargo receiving passage there between;
providing each of the pair of side walls with a longitudinal free edge region in order to expose the cargo receiving passage to the cargo support surface,
lifting the cover to a first position above the cargo support surface;
lowering the cover to a second position in abutment with the cargo support surface, and
removably coupling each of the longitudinal free edge regions to a corresponding longitudinal edge region.

In another aspect of the present invention, there is provided a cover for a semi-trailer vehicle having a cargo support surface bordered by a pair of longitudinal edge regions, the cover comprising a unitary structure having a roof, a pair of side walls forming a cargo receiving passage there between; each of the edge regions including an upwardly directed longitudinal rail member, each of the side walls including a lower edge region with a transverse gap formed therein for receiving the rail member, and releasable locking means for locking each of the lower edge regions relative to the cargo support surface, with each of the rails engaged the corresponding gap.

In another aspect of the present invention, there is a method for covering cargo on a semi-trailer vehicle having a cargo support surface bordered by a pair of longitudinal edge regions, each of the edge regions including an upwardly directed longitudinal rail member the method comprising the steps of:
providing a roof and a pair of side walls forming a cargo receiving passage there between;
forming in each of the side walls a lower edge region with a transverse gap therein for receiving the rail member, and
releasably locking each of the lower edge regions relative to the cargo support surface, with each of the rails engaged the corresponding gap.

In still another aspect of the present invention, there is provided a cover for a semi-trailer vehicle having a cargo support surface bordered by a pair of longitudinal edge regions, the cover comprising a unitary structure having a roof, a pair of side walls forming a cargo receiving passage there between; each of the edge regions having a rub rail member forming an outermost periphery thereof, each of the side walls including a lower edge region with an inner face formed thereon, releasable locking means for locking each of the lower edge regions relative to the cargo support surface, to engage the rub rail with the inner face, substantially along the entire length thereof.

In yet another aspect of the present invention, there is provided a method for covering cargo on a semi-trailer vehicle having a cargo support surface bordered by a pair of longitudinal edge regions, each of the edge regions including a rub rail member forming an outermost periphery thereof; the method comprising the steps of:
forming on each of the side walls, a lower edge region with an inner face formed thereon, and
releasably locking each of the lower edge regions relative to the cargo support surface, to form a substantially continuous engagement of the rub rail with the inner face.

In still another aspect, the present invention provides a caster wheel comprising a wheel, axle means for mounting the wheel for rotation about a rolling axis, swivel frame means for supporting the wheel for rotation about a swivel axis, ground engaging means for inhibiting displacement of the caster wheel.

BRIEF DESCRIPTION OF THE DRAWINGS

Several preferred embodiments of the present invention will now be described, by way of example only, with reference to the appended drawings in which:

FIG. 1 is a perspective view of a cover for a flat deck semi-trailer vehicle;

FIG. 1b is a sectional view taken on line 1b—1b of FIG. 1a;

FIG. 1c is a schematic end view of the cover of FIG. 1 in a storage position.

FIG. 8 is a fragmentary assembly view taken arrow 8 of FIG. 6;

FIG. 8a is a view taken on arrow 8a of FIG. 8;

FIG. 8b is a view taken on arrow 8b of FIG. 8;

FIG. 9 is a fragmentary assembly view taken arrow 9 of FIG. 6;

FIG. 13 is a side view of one component of the portion illustrated in FIG. 1a;

DESCRIPTION OF THE PREFERRED EMBODIMENTS

Figure 1A:
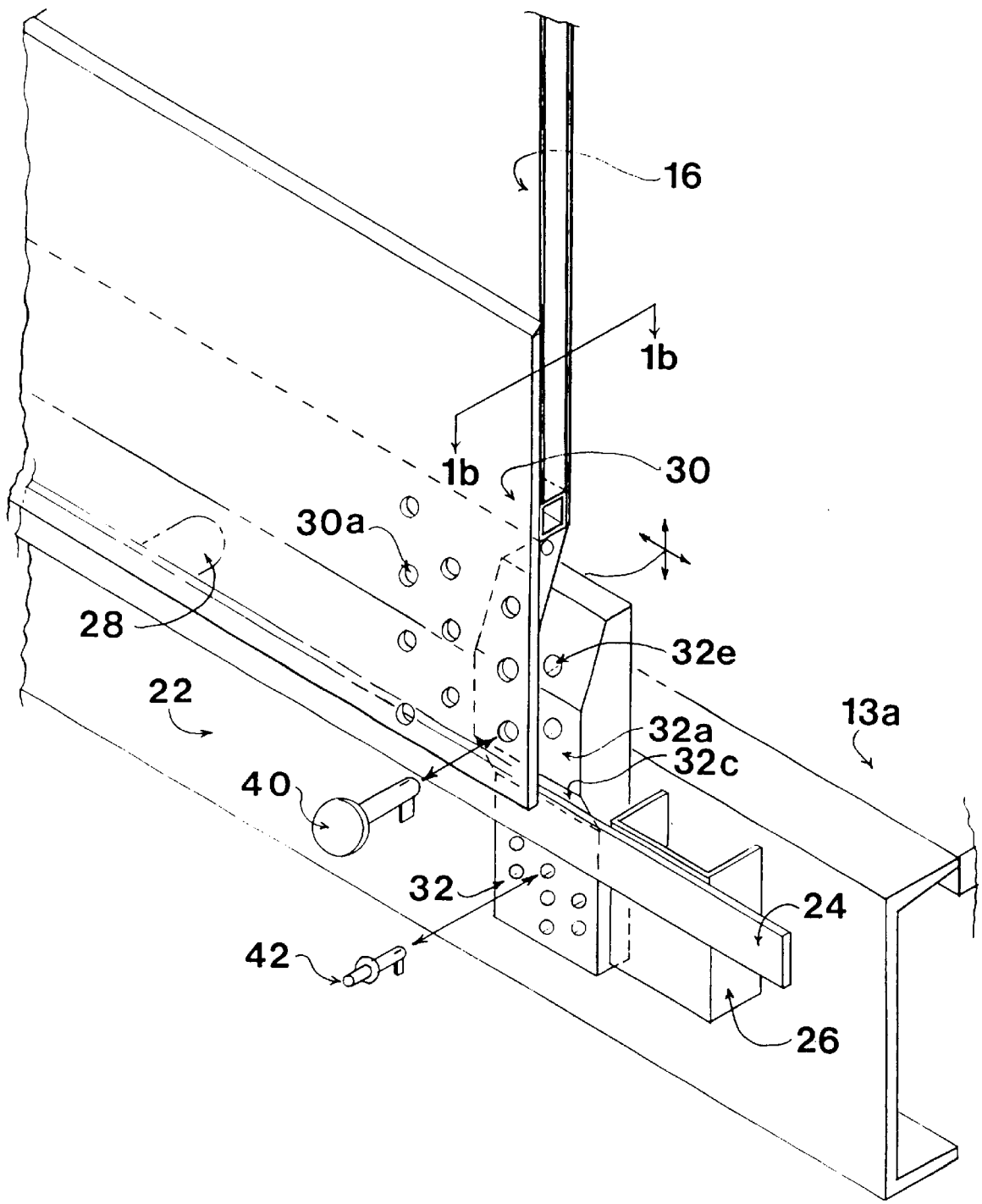
FIG. 1a magnified fragmentary perspective of a portion of the cover illustrated in FIG. 1 in an operative position.

Referring to the figures, there is provided a cover 10 for a flat deck semi-trailer vehicle 12 having a deck 13 with a cargo support surface 13a. As will be described in more detail below, the cover has a unitary structure having a roof 14, a pair of side walls 16 forming a cargo receiving passage there between. Each of the side walls should be sufficiently long to accommodate standard flat-deck trailers such as those having the typical length of 45', and a height of about 8'7". The roof may have similar length of about 45' and a width of about 8'6". Dimensions such as these should allow the cover to conform to trailer manufacturers' specifications, and to the Roads and Transport Association of Canada, as well as to the applicable Canadian and U.S. department of transportation specifications. Other dimensions may also be used. For example, a cover that is 45' long may be used, if desired, to cover a cargo having a length of 45' or less on a trailer which is 45' or longer. Alternatively, the cover may only be a portion of the length of the trailer.

A pair of end wall portions are joined to the side wall and roof portions so as to close the cargo-receiving passage. At least one of the end wall portions includes a retractable access door, known as an overhead door 20. In this case, each end wall portion has an overhead door as shown.

The deck 13 includes a longitudinal periphery 22 including a pair of longitudinal edge regions and means is provided for engaging the cover with the trailer adjacent the longitudinal periphery. As is typical with flat deck trailers of this type, the trailer has an upwardly directed longitudinal rail member in the form of a rub rail 24 which is positioned on the deck adjacent the periphery and is supported by a number of spaced support flanges 26, which together with the rub rail form a plurality of pockets, known as stake pockets and a plurality of passages each between a pair of stake pockets. As can be seen by FIG. 1a, the rub rail may also be positioned by way of pipe supports shown in phantom at 28.

As will be described, each of the side walls terminates at a longitudinal free edge region to expose the cargo receiving passage to the cargo support surface. In addition, coupling means is provided for removably coupling each of the longitudinal free edge regions to a corresponding longitudinal edge region.

Figure 1B:
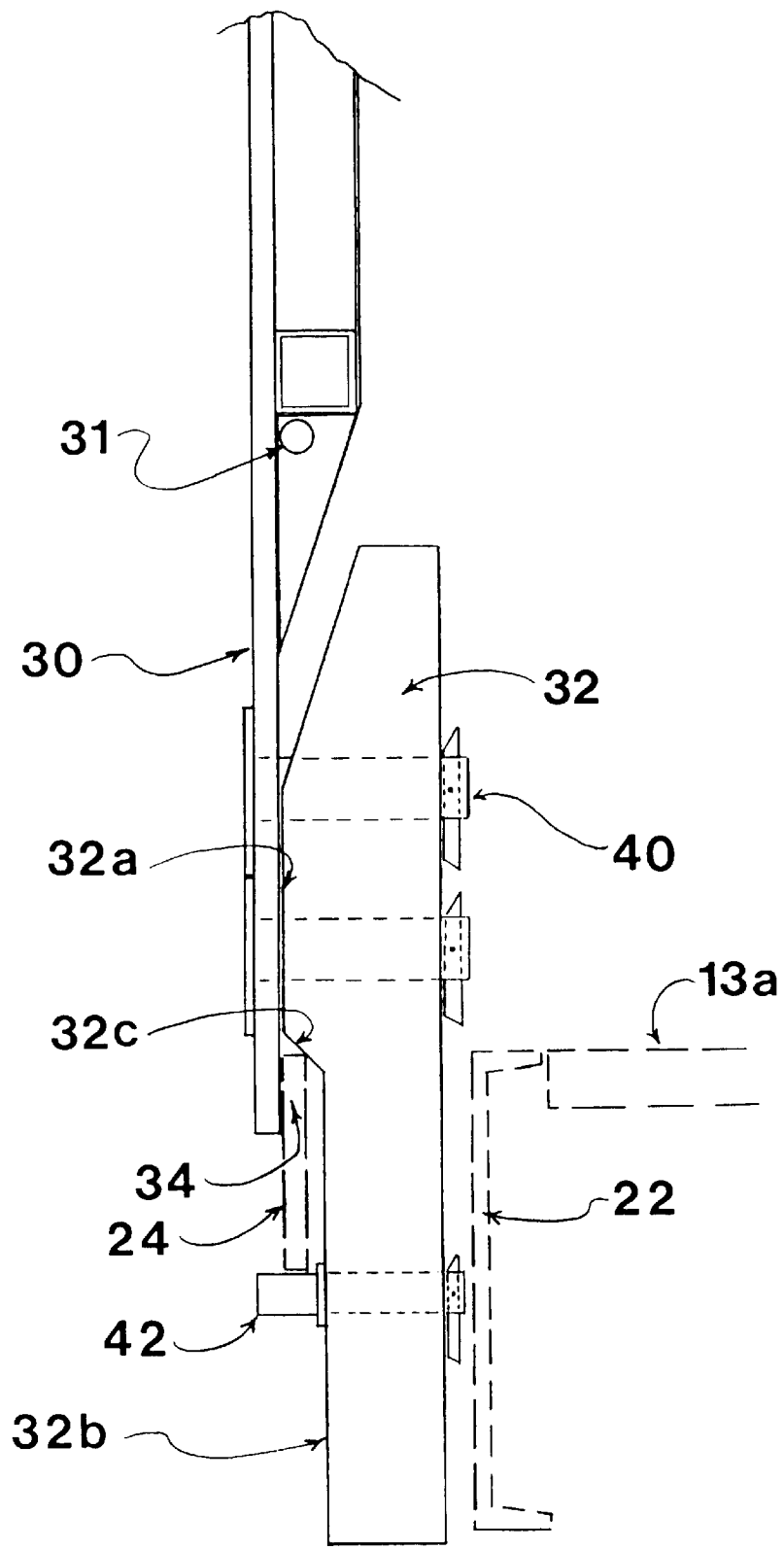

The coupling means are in the form of coupling members 32 for projecting through the passages. In this case, the coupling members are spaced along the skirt portion and each includes an upper section 32a for attachment to the skirt portion and a lower section 32b laterally spaced from the skirt portion so as to form a gap 34 there between to receive the rub rail in the engaged position as shown in FIG. 1b. Each coupling member is independently adjustably mounted to the lower skirt portion.

Each of the coupling members also includes an intermediate section 32c with an inner surface being inclined relative to and facing the gap so as to draw the rub rail into abutment with the lower edge region. In this manner, the lower edge region is arranged to extend below the cargo support surface and the coupling members are arranged to draw the inner face of the skirt portion tight to the outer face of the rub rail to provide a tight fit so as not to exceed approved widths of trailers.

For example, the coupling members may be about 2" thick×4" wide×12" high with a pattern of coupling member mounting holes 32e to allow for independent vertical adjustment each of the coupling members relative to mating holes 30a formed in the lower skirt portion. In this example, there may not only be 92 inches of effective width of coupling member applied along the length of the side wall but there may also be 540 square inches of effective width of the lower skirt portion bearing against the rub rail, that is by being held tight against the rub rail with an exemplified skirt overhang of 1 inch.

A plurality of removable pin members, for example swivel lock steel pins 40, are provided for releasably and adjustably mounting the upper section of each of the coupling members to the lower skirt portion by way of mating holes 32e, 30a respectively formed in each. A plurality of removable pin members, such as tension lock steel pins 42, are also provided for inhibiting removal of the coupling member from the passage and extend through the holes 32d in the lower section 32b. The lower skirt portion 30 also has a conduit 31 for a motor control circuit as will be described. The conduit 31 is held in place by a molded polymer material at the inside face of the lower skirt portion and at the junction with the lower edge of the side wall.

Referring to FIG. 1, lifting means is provided for lifting the cover between a first position above the cargo support surface and a second position in abutment with the cargo support surface. In this case, the lifting means includes a plurality of spaced leg arrangements extending below the cover, one of which is shown at 50. The leg arrangements are length extensible and each includes a jack portion 52, such as a caster jack. A particular feature of the leg arrangement is the use of a weather protected motor and a reduction gearbox, collectively shown at 54.

Each jack portion 52 has a lower leg segment 52a movable relative to an upper leg segment 52b by way of a rotatable crank member shown at 52c. In this case, the rotatable crank member is connected to the output shaft of the reduction gearbox 54a which in turn is coupled to the output shaft of the motor unit 54b.

Figure 3:
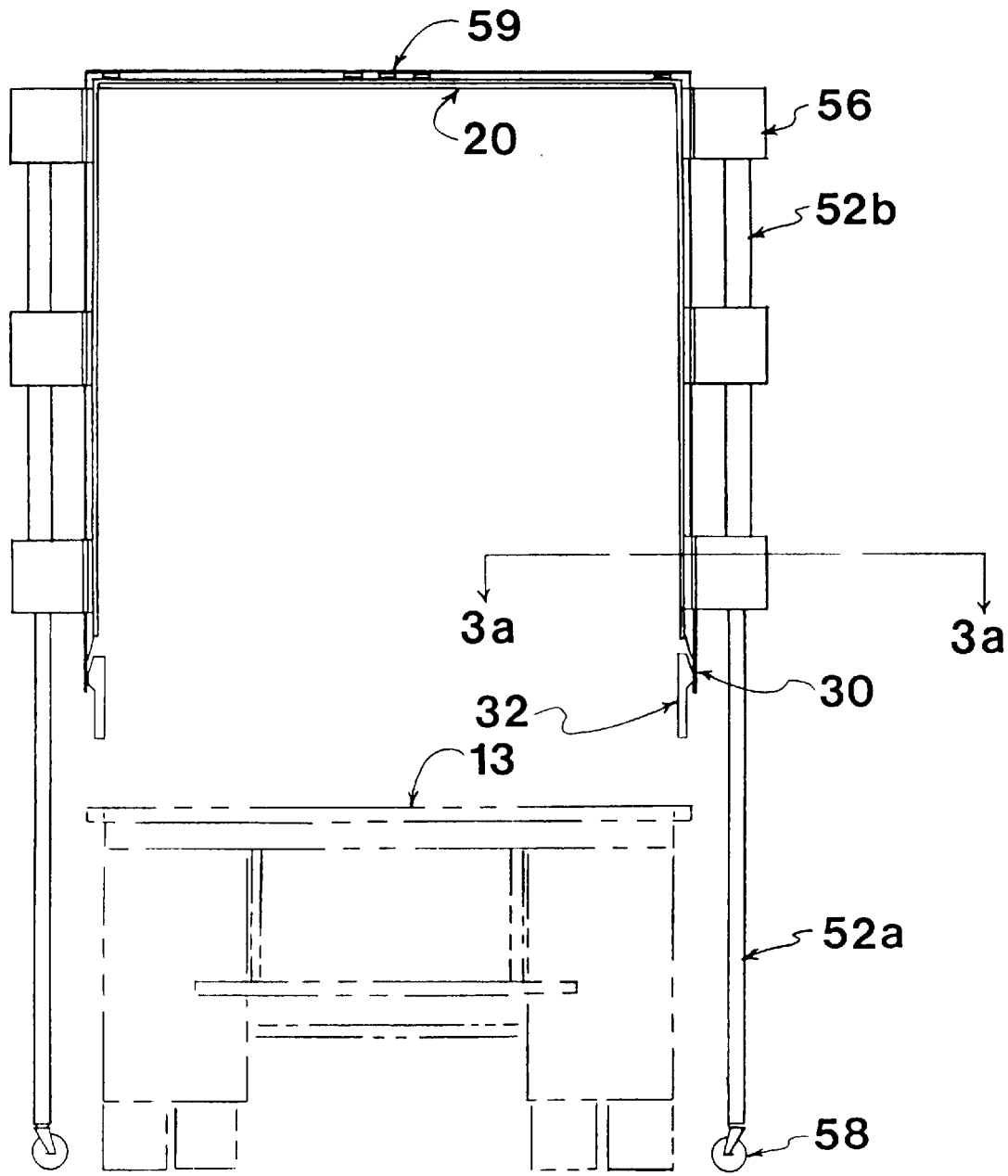
FIG. 3 is a magnified view of the cover according to FIG. 2 in another operable position.
Figure 2:
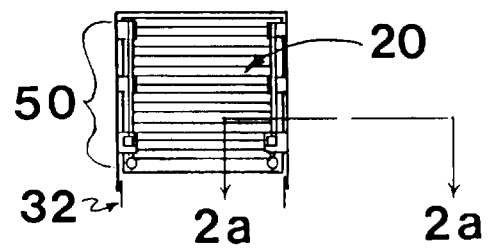
FIG. 2 is an end view of the cover illustrated in FIG. 1 in one operative position.
Figure 3A:
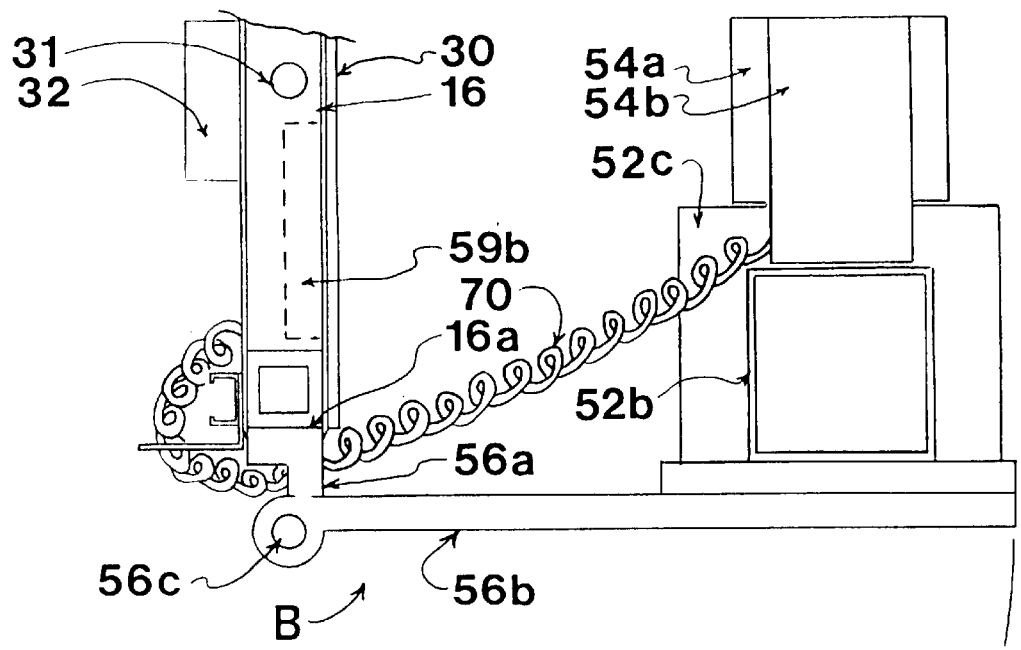
FIG. 3a is a sectional view taken on line 3a—3a of FIG. 3.
Figure 2A:
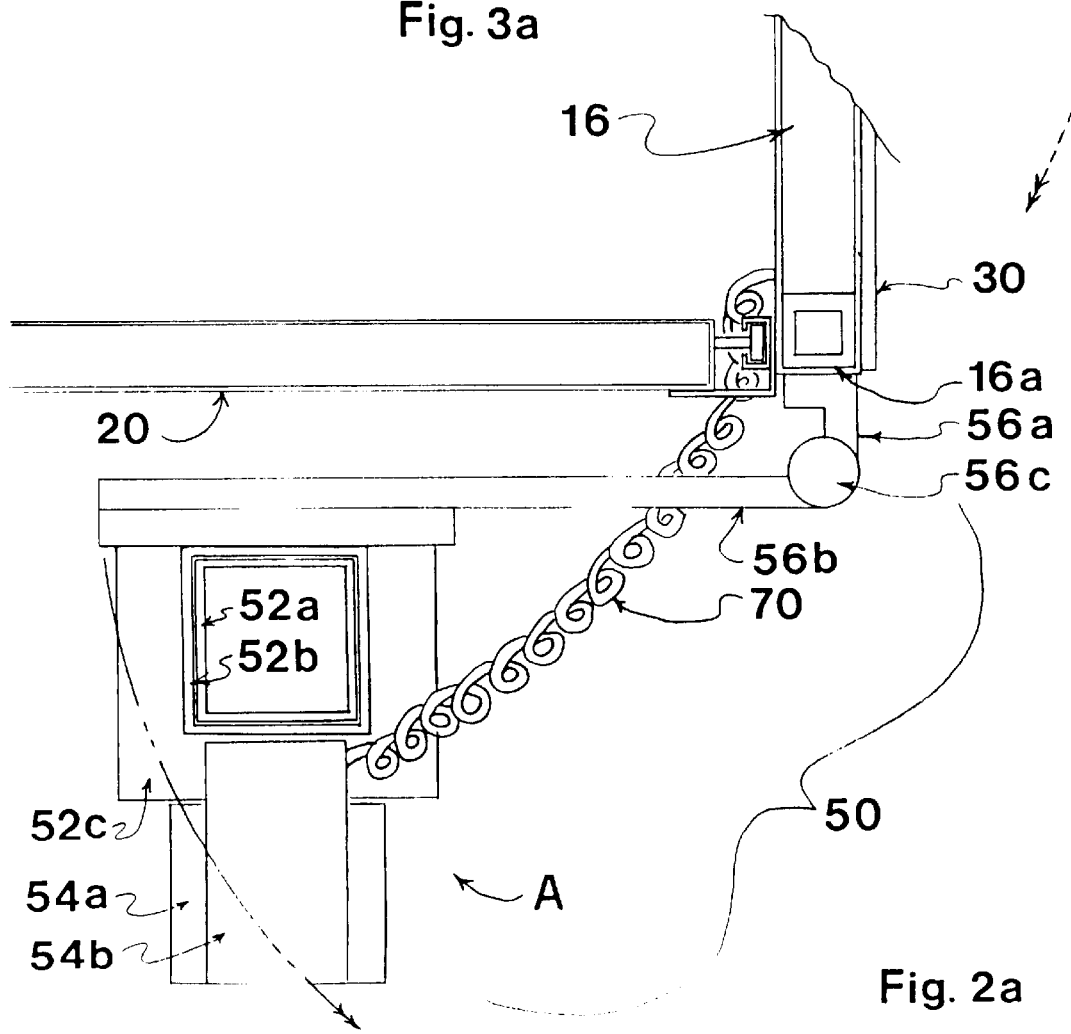
FIG. 2a is a sectional view taken on line 2a—2a of FIG. 2.

Each leg arrangement is movable between a storage or secured position shown in solid lines at 'A' in FIGS. 1 and 2 and an operative, or swung out, position 'B' in FIGS. 1 and 3 and a mounting means is provided in the form of a hinge assembly, such as three butt-type hinges, shown at 56, for mounting each of the leg arrangements to a corresponding wall portion. Referring to FIGS. 2a, 3a, each hinge 56 has a first hinge element 56a which is secured to the rear edge 16a of the wall portion 16 and a second hinge element 56b fixed to the leg arrangement with a pivot member 56c providing a vertical swing axis. Thus hinge assembly is arranged to pivotally mount each leg arrangement for movement between the storage and operable position about the vertical swing axis and to releasably lock the leg arrangements in place, such as in the storage and operative positions as shown. Each of the leg arrangements also has a lower end for engaging a ground surface, including a caster wheel The cover is provided with a lighting circuit which includes a number of clearance lights surface mounted on the front, rear and sides of the roof as shown at 59 in FIGS. 1 and 3a, in walls 16 in complementary recess formed therein for marker clearance lighting 59a and lower marker lighting shown at 59b in FIG. 1.

Figure 4A:
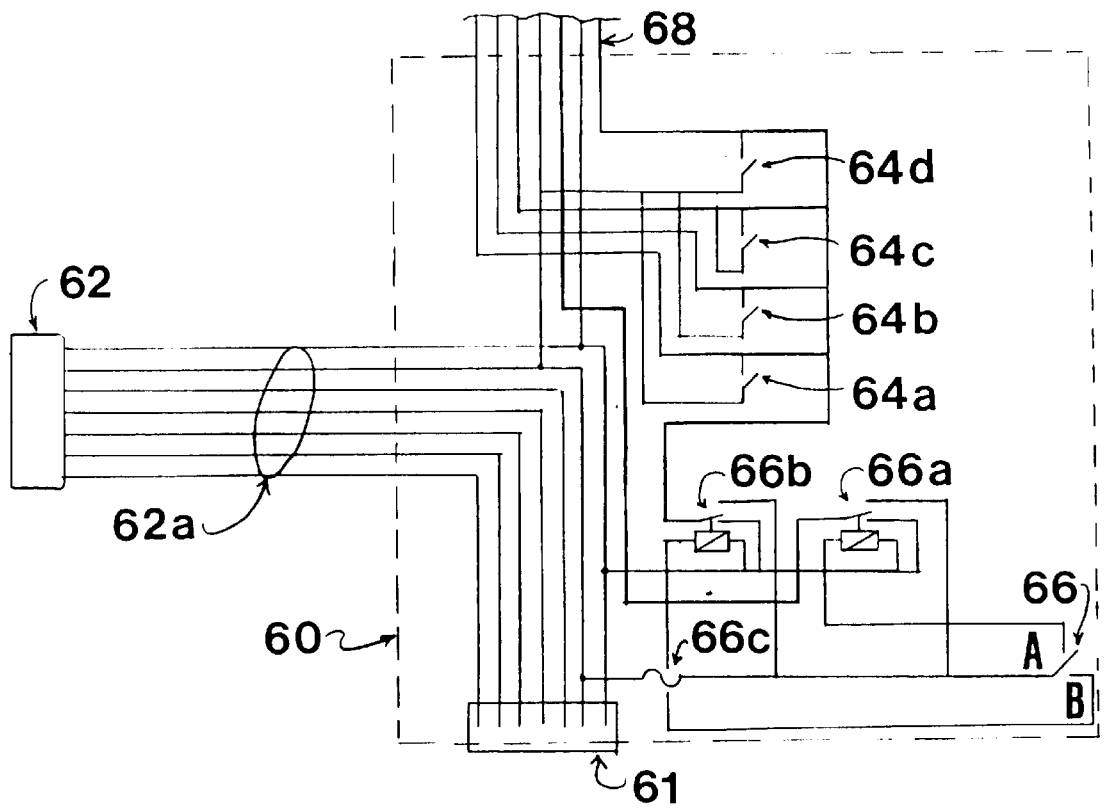
FIG. 4a is a more detailed schematic view of one component of the portion illustrated in FIG. 4.
Figure 4:
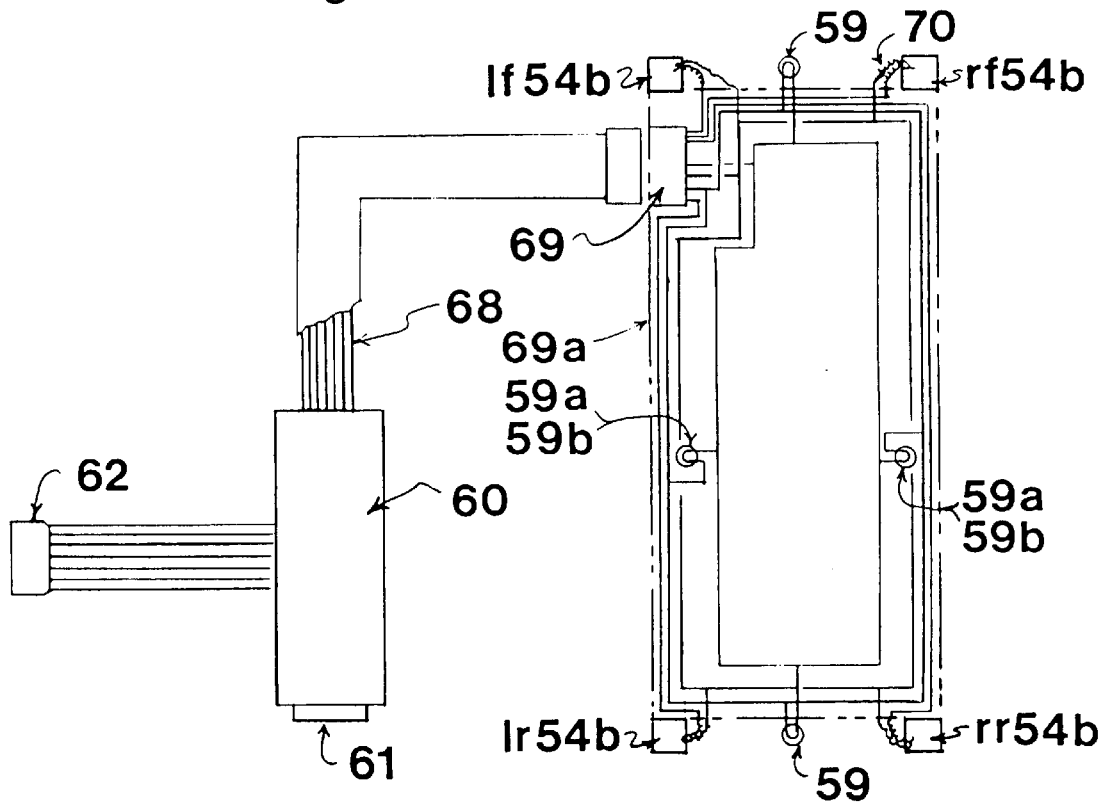
FIG. 4 is a schematic view of another portion of the cover illustrated in FIG. 1.
Figure 5:
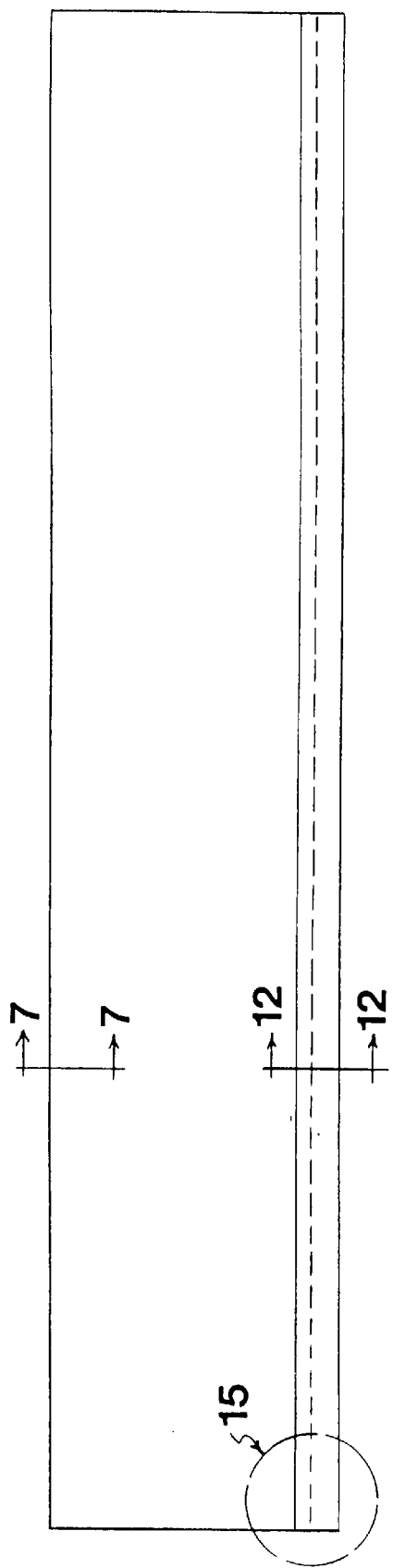
FIG. 5 is a side view of the cover illustrated in FIG. 1.
Figure 5A:
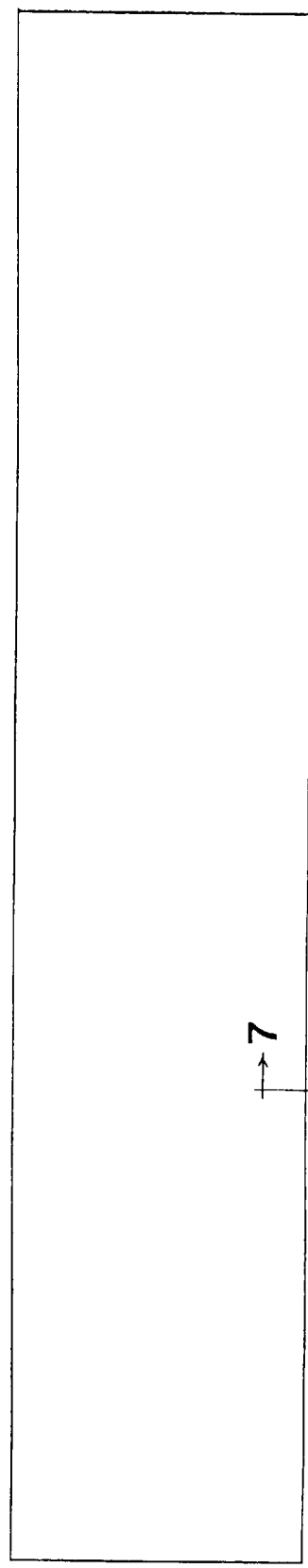
FIG. 5a is a plan view of the cover illustrated in FIG. 1.
Figure 15:
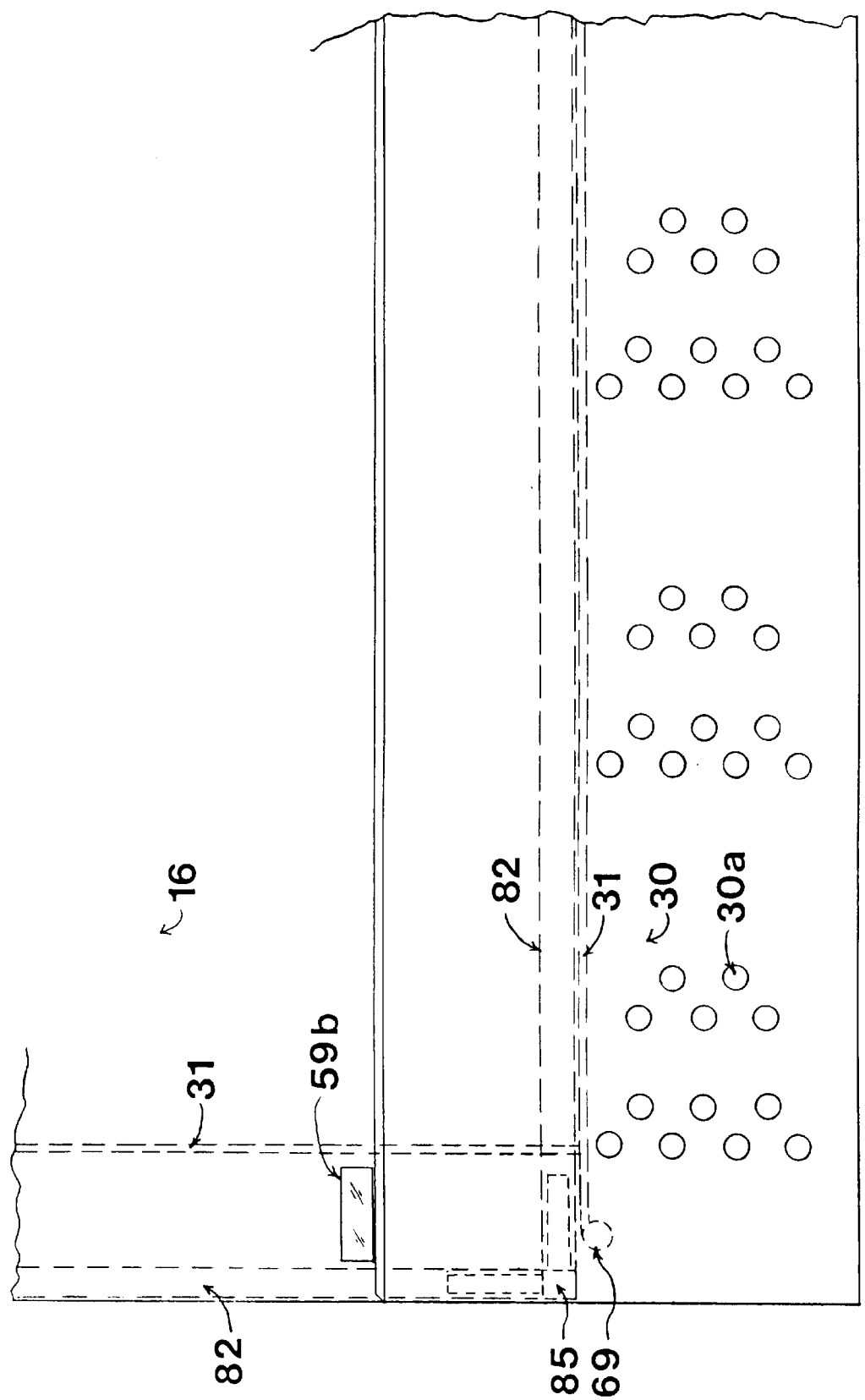
FIG. 15 is a magnified view of the region encircled at 15 in FIG. 5.

Referring to FIG. 4, each motor unit is actuated by a controller 60 which receives power from the tractor by way of a plug 62 which fits an electrical outlet in the utility area behind the vehicle cab and is provided with a multiple strand cable as shown at 62a, each strand conveying a particular circuit. The controller also has an outlet plug 61 to be coupled with the trailer electrical hook-up plug, to continue the electrical circuitry from the tractor to the trailer. Referring to FIG. 4a, the controller 60 has a switching means in the form of four switch units 64a to 64d to convey the power to each of the motors, depending on the particular movement required, that is to raise or lower the specific leg arrangements. The switch units allow for the position of any corner of the cover to be adjusted individually depending on irregularities of the ground surface. The controller also includes a key switch 66 which serves as the main switching arrangement to simultaneously power all four motors, by way of two relays 66a, 66b, one for upward movement and the other downward movement. In this case, the key switch has a number of predetermined positions including a 'raise' position when the switch engages contact 'A', a 'lower' position when the switch engages contact 'B' and a manual override position when the switch is intermediate contacts 'A' and 'B' (wherein the motors may be actuated simultaneously to adjust the position of the cover). The switch 66 and its associated relays 66a, 66b are also provided with a thermal breaker shown at 66c. The controller is also provided with a self retractable cord shown schematically at 68 with a sufficient length from the controller to a designated electrical junction 69 on the cover, to join with a motor control circuit and a lighting circuit on the cover, shown generally at 69a. The control circuit extends through the conduit 31 in the lower skirt portion and includes individual lengths of coiled wire 70 to join each motor thereto. It will be understood that the cover will be provided with sufficient conduit to carry the electrical circuitry for the cover and this will also include lateral conduit through the roof and vertically through the walls (the latter of which is shown in FIG. 15).

The controller may be permanently mounted to the cab of the tractor unit or alternatively may be portable, that is with its own power supply to enable the cover to be adjusted in the absence of the tractor unit. An additional controller junction 69 may be located at the rear of the trailer for the portable controller or for attachment of another cover for multi-trailer configurations known as 'B trains'.

Figure 6:
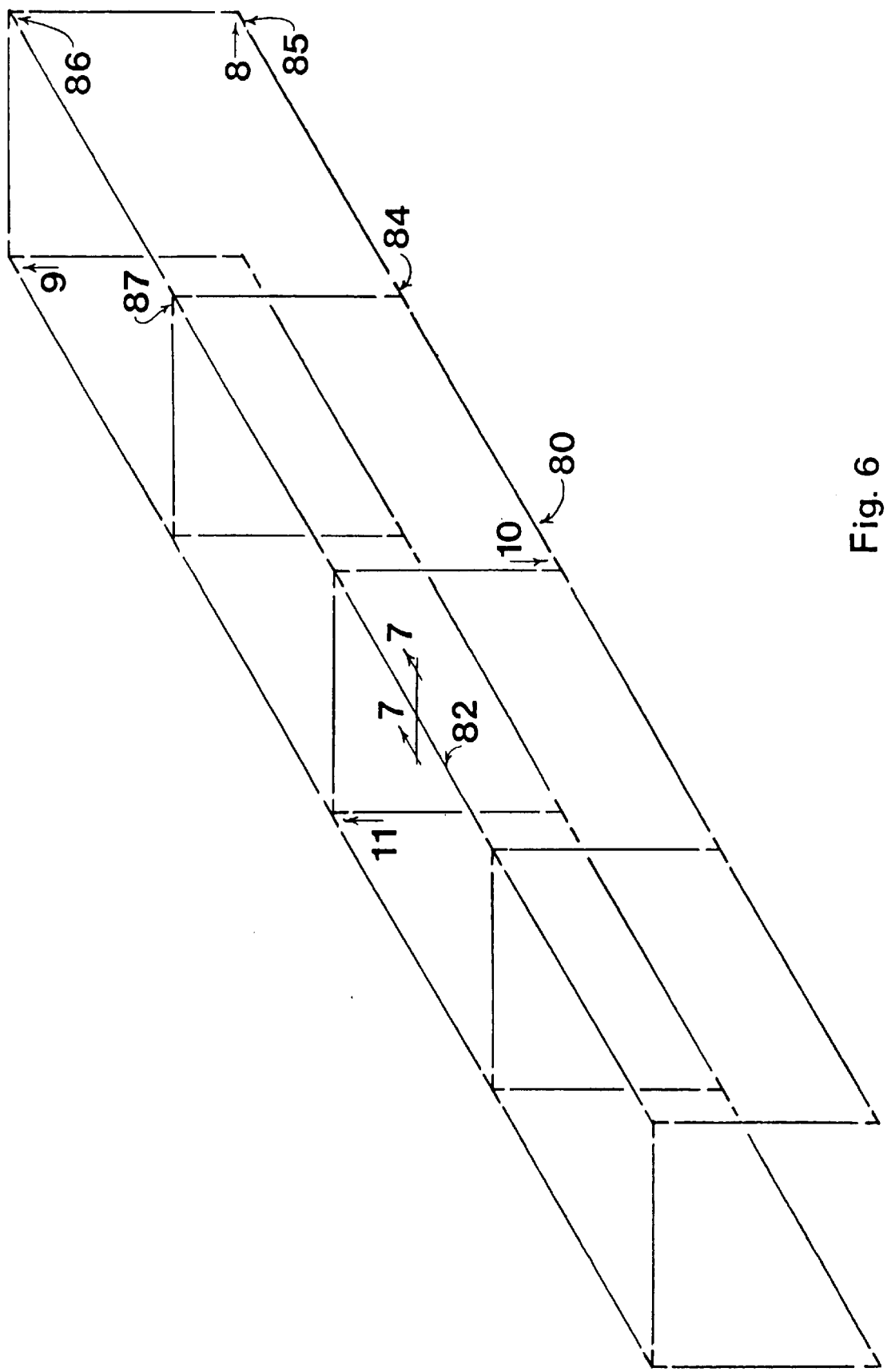
FIG. 6 is a perspective schematic view of an interior portion of the cover illustrated in FIG. 1.

As shown schematically in FIG. 6, the roof 14 and the side walls 16 are formed in a unibodied construction and includes a frame subassembly 80, the side wall and roof portions being integrally formed therewith. The subassembly should have standard dimensions such as 45'×7'10"×8'6" and is formed by a number of frame members such as square sectioned aluminum members 82 fixed to complementary bracket unions 84 to 87. These unions are provided in a number of configurations each of which includes a body member with a number of square sectioned legs extending outwardly therefrom. As shown in the case of union 85 in FIG. 8, each body 85a has a number of outer surfaces 85b to be coextensive with those of the frame members, while the legs each have a reduced rectangular cross section to fit the inner cross section of the frame members and are formed from a molded solid fibre reinforced phenolic composition.

Figure 7:
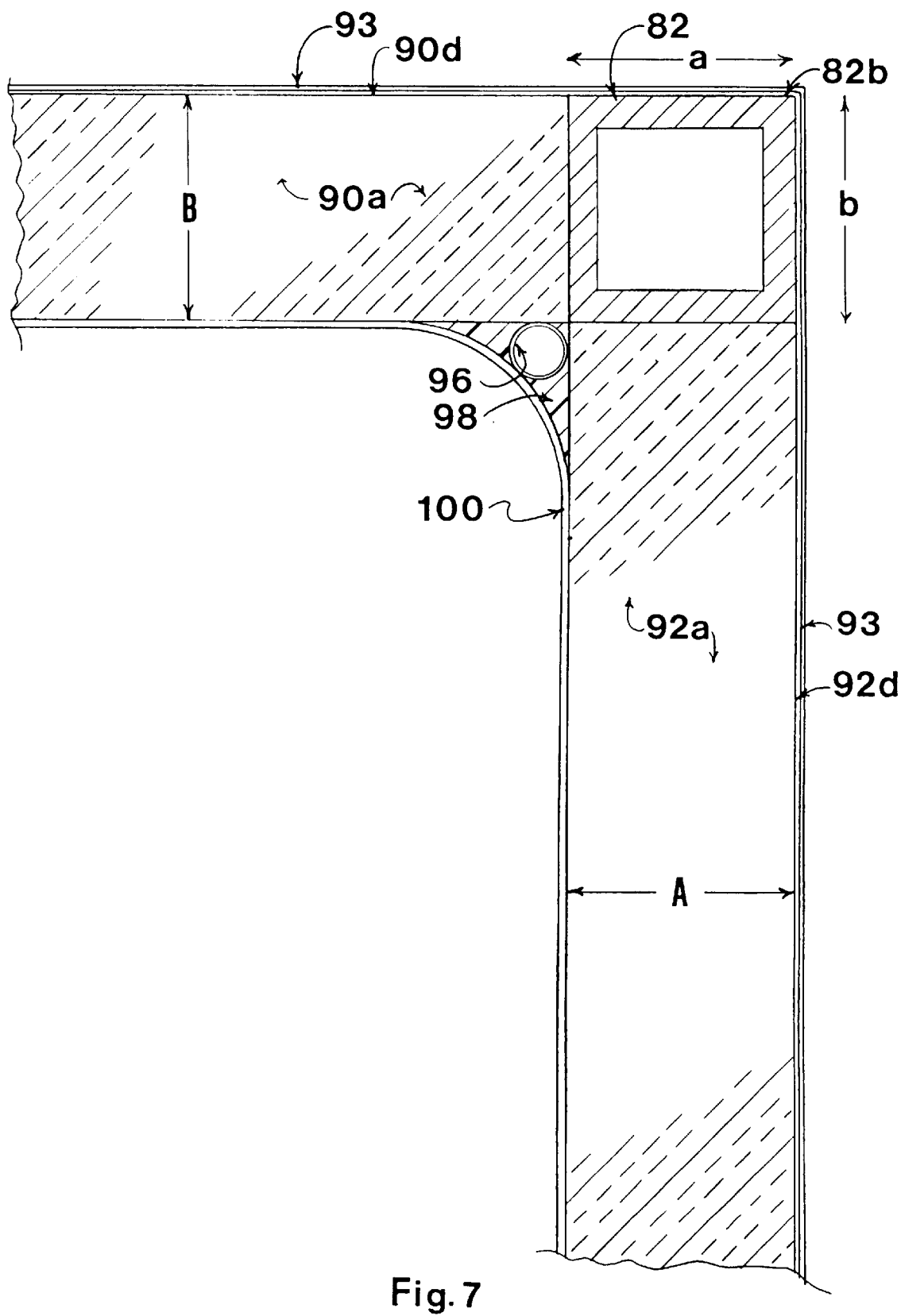
FIG. 7 is a sectional view taken on line 7—7 of FIG. 6.
Figure 10:
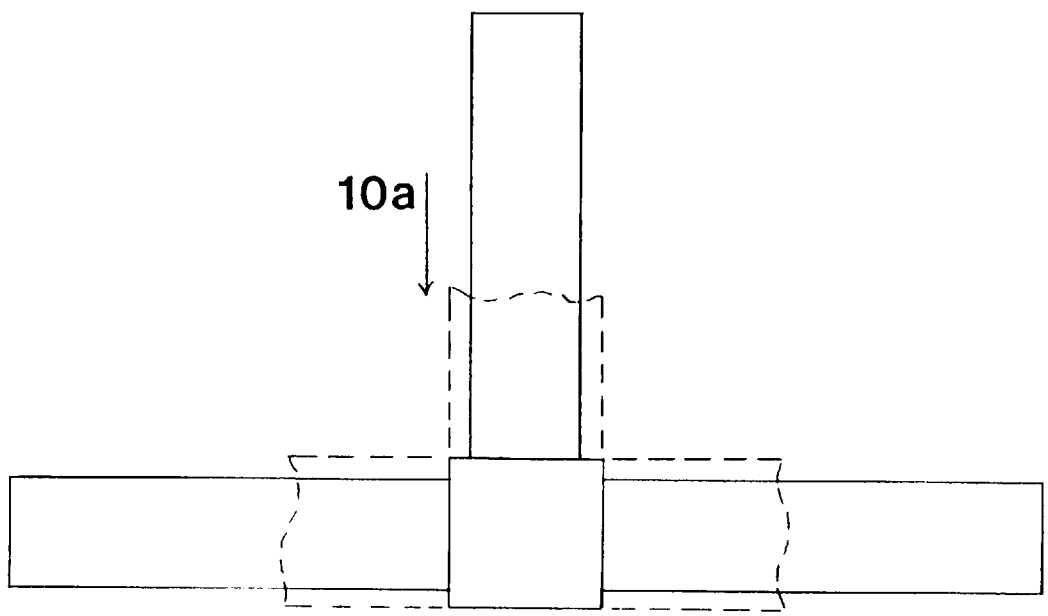
FIG. 10 is a fragmentary assembly view taken arrow 10 of FIG. 6.
Figure 10A:
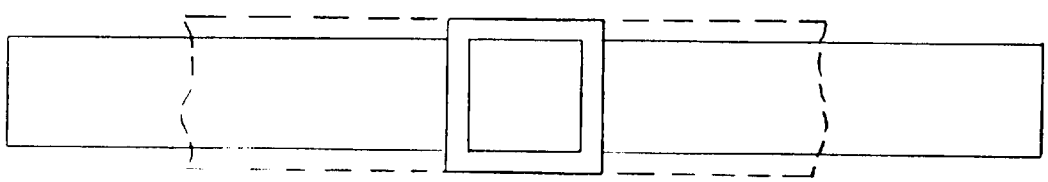
FIG. 10a is a view taken on arrow 10a of FIG. 10.
Figure 11:
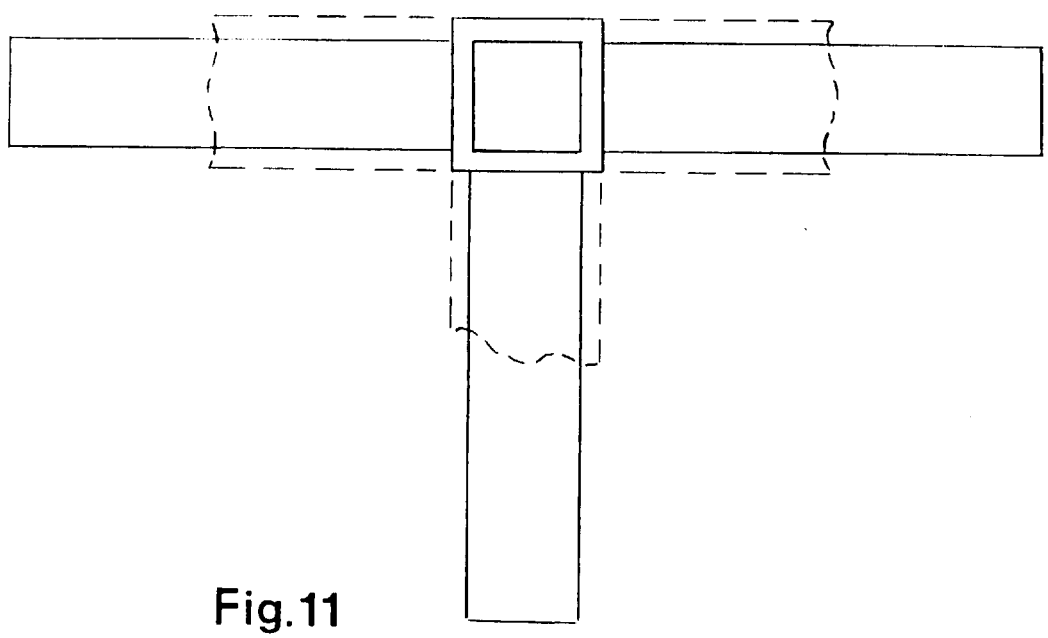
FIG. 11 is a fragmentary assembly view taken arrow 11 of FIG. 6.
Figure 12:
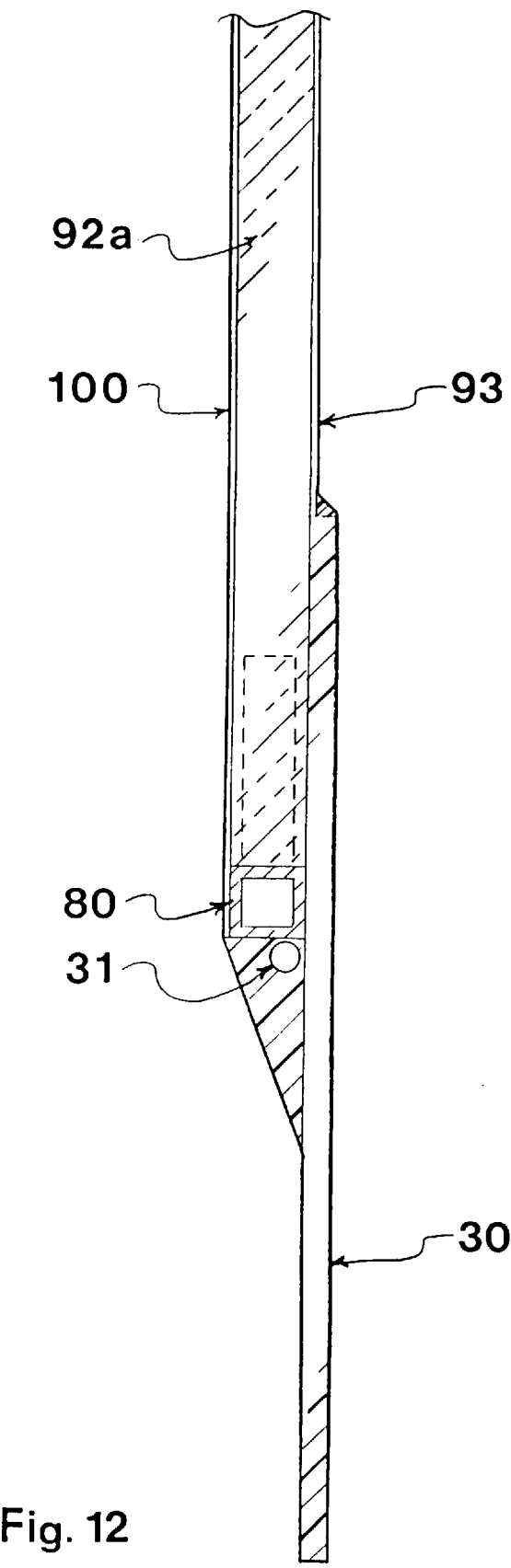
FIG. 12 is a sectional view taken on line 12—12 of FIG. 5.
Figure 13:
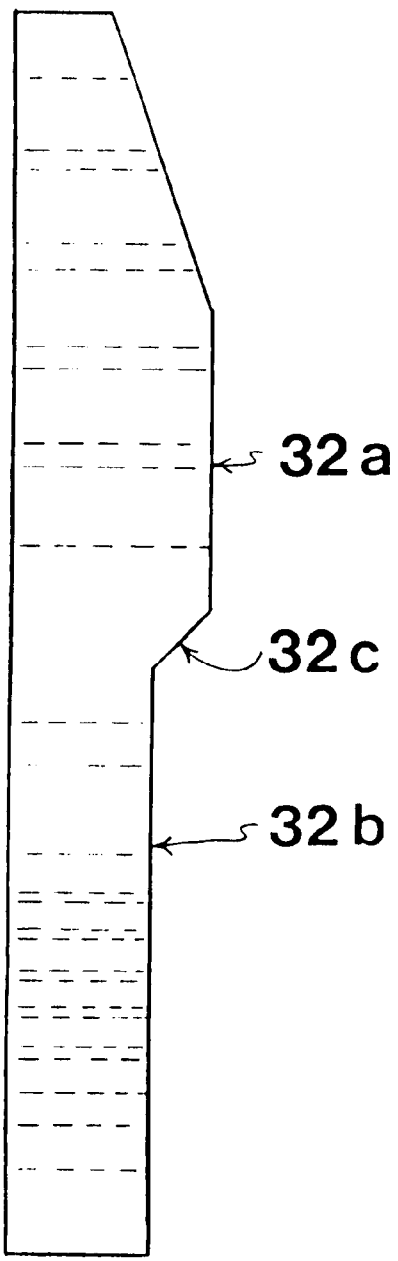
Figure 14:
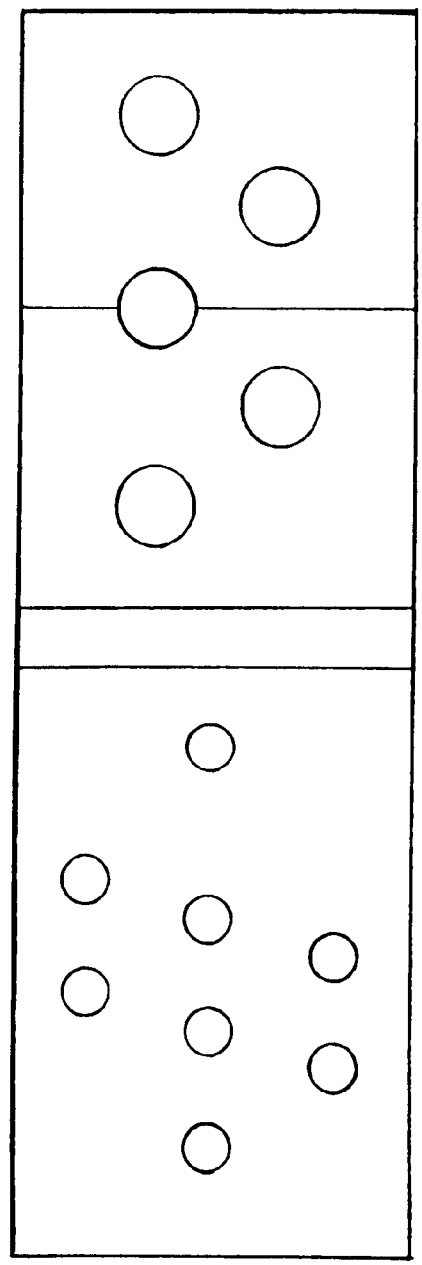
FIG. 14 is a front view of the portion illustrated in FIG. 13.

Referring to FIG. 7, each of the roof and side walls includes an interior expanded polymeric layer 90a, 92a and an exterior skin 93 bonded thereto. The frame members of the subassembly includes a plurality of intermediate vertical members and a plurality of intermediate horizontal members, one of which is shown at 82, each of the vertical and horizontal members having one dimension 'a' which is equal to the thickness 'A' of one adjacent layer and another dimension 'b' which is equal to the thickness 'B' of another adjacent layer. Each of the interior layers has a pair of edges in abutment with a corresponding pair of the vertical and horizontal members.

Each of the interior layers has an exterior face 90$d$, 92$d$ and each of the vertical and horizontal members has an exterior face 82$b$ which is coextensive with the exterior face of a corresponding interior layer and the exterior skin 93 is bonded to the coextensive exterior faces. The interior expanded polymeric layer is selected from expanded polyethylene, polyurethane or polyvinyl chloride resin materials and has a relatively high density for rigidity and strength. The interior layers may also, if desired, be formed from materials such as plastic or aluminum honeycomb-type panel, or carbon fibre composite materials and the like.

The roof and side wall panels meet at a corner region, further comprising a conduit for receiving electrical wiring, for example a ¼ ID conduit 96 carrying the lighting circuit wiring which is held in position by a molded polymer material 98. An interior skin 100, similar to the exterior skin, extends across the entire inner surface area of the structure and is a laminated material, preferably a laminated phenolic material. However, the interior and exterior skins may also be formed from materials such as sheet aluminum, plastic materials such as polyethylene and polyvinyl chloride, fibre reinforced plastic sheeting and the like and, if desired, may be provided with UV protective coatings.

To attach the cover to the flat deck semi-trailer, the vehicle operator first positions the rear end of the flat deck trailer in front of the cover and connects the controller with the electrical junction in the tractor's utility area to supply power to the cover. The self retractable cord 68 is then withdrawn from the controller and joined to the designated electrical junction on the cover.

The operator then manually opens both overhead doors to expose the cargo receiving passage, and moves the leg arrangements from their storage position to their operable position. The operator then activates the key switch to deliver power simultaneously to the four motors thereby to raise the cover to an elevated position with predetermined clearance above the cargo support surface of the flat deck trailer. The operator then backs the trailer through the front overhead door opening of the adjacent end wall portion to locate the cover above the cargo support surface.

The operator lowers the cover to a position nearer to the cargo support surface but still sufficiently spaced therefrom so that the operator can install the individual coupling members on the bearing skirt with the swivel lock steel pins by penetrating the mating holes in the bearing skirt and the coupling members thereby to tightly position the coupling member with the locking portion of the pin on inside face of coupling member (as shown in FIG. 1$b$.

The operator can then make subsequent adjustments as needed if any of the coupling members are interfering with load binders or existing rub rail supports for the cargo by simply selecting alternate passages. In this manner, each coupling member is arranged so that each is capable of penetrating a corresponding passage before lowering the cover in its final position with the rub rail in the gap as shown in FIG. 1$b$.

The cover is then secured to the flat deck semi-trailer in such a manner that the rub rail abuts the inclined face of the intermediate section thereby drawing the rub rail outer face in into tight engagement with the inner face of the lower skirt portion. The tension lock steel pins are then inserted through the coupling members below the rub rail. With the cover now in place, the operator retracts the leg arrangements to a position above the flat deck and thereafter pivots the leg arrangements to their storage position as shown in FIG. 1. The leg arrangements are then secured in place against the closed overhead doors, thereby completing the installation.

To remove the cover, the above procedure is reversed.

Referring to FIG. 1$c$, the cover 10 may be placed in a storage position by fastening the cover to a support member, such as an I-beam shown at 110, positioned transversely relative to the cover. Furthermore, the cover 10 may be restrained to a nearby anchoring object, such as a pole shown at 112 by some form of restraint such as a cable as shown at 114, which may retractable if desired. It may also be desirable to have the retracting cable lockable in any one of a number of lengths so that the cable can be tightly held between the cover and the anchoring object where the anchoring object may be at varying distances from the cover from one ste to the next. This enables the cover 10 to be stored on the ground or other suitable surface in a manner that affords some resistance to wind, in cases where the cover is not otherwise fastened to the surface, by way of the coupling members 32. Alternatively, the cable may be attached to the vehicle itself, such as to a designated anchor point on the flat deck, to guard against the wind lifting the cover when being installed thereon.

Referring to FIGS. 16 to 19, there is provided another coupling member shown at 150 for attachment along the skirt portion. In this case, the coupling member includes a first segment 152 with an upper region 152$a$ which is arranged for anchoring to the cover, by way of passages 152$b$, and a corresponding number of removable fasteners 153 to extend there through.

A second segment is provided at 154 which has a number of passages 154$a$ for anchoring relative to the longitudinal rail member, by way of fasteners shown at 155, such as removable pin members, for example the tension lock steel pins 155, as discussed herein above. Furthermore, the first segment 152 is provided with a number of slots 152$c$ which overly the passages 154$a$ in order for the same removable pin members 155 to pass there through.

Figures 16, 17, 18:
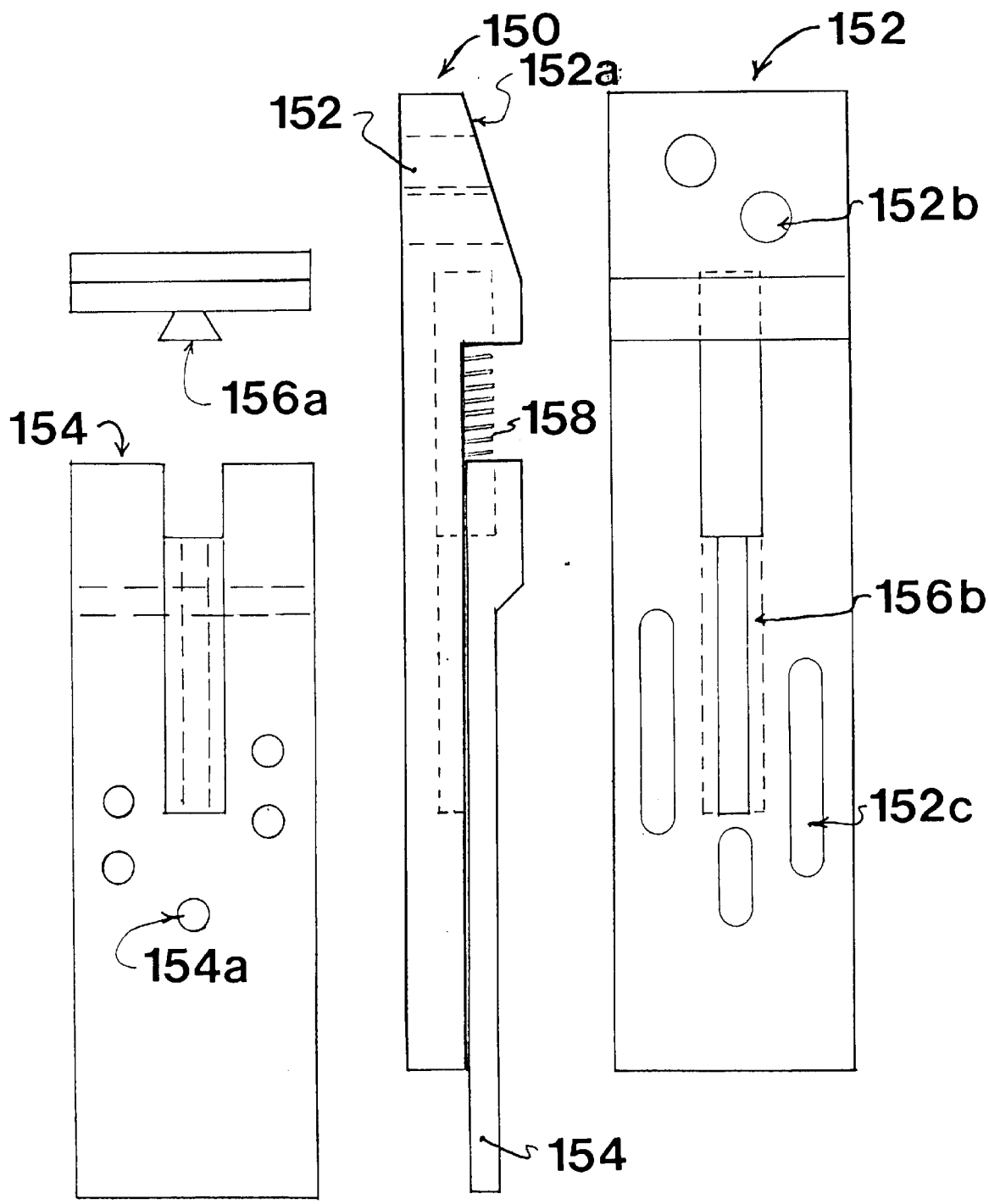
FIG. 16 is a side view of a portion of another cover.
FIG. 17 is a front view and a top view of one segment of the portion shown in FIG. 16.
FIG. 18 is a front view of another segment of the portion shown in FIG. 16.

The second segment 154 is movably mounted relative to the first segment by way of sliding coupling means shown at 156, which is preferably in the form of a projection 156$a$ slidably mounted in a complementary shaped recess 156$b$. Biasing means, such as spring means, in the form of a compression spring 158, is also provided between the first and second segments for cushioning movement there between as well as for biasing the first and second segments toward an extended position as shown in FIG. 17.

Thus, the first segment is slidable engaged with the second segment. The aligned passages 154$a$ and the slots 152$c$ together with the fastener forms a first limit of relative travel between the first and second segments, while the spring means positioned between the first and second segments forms a second limit of relative travel between the first and second segments.

Figure 19:
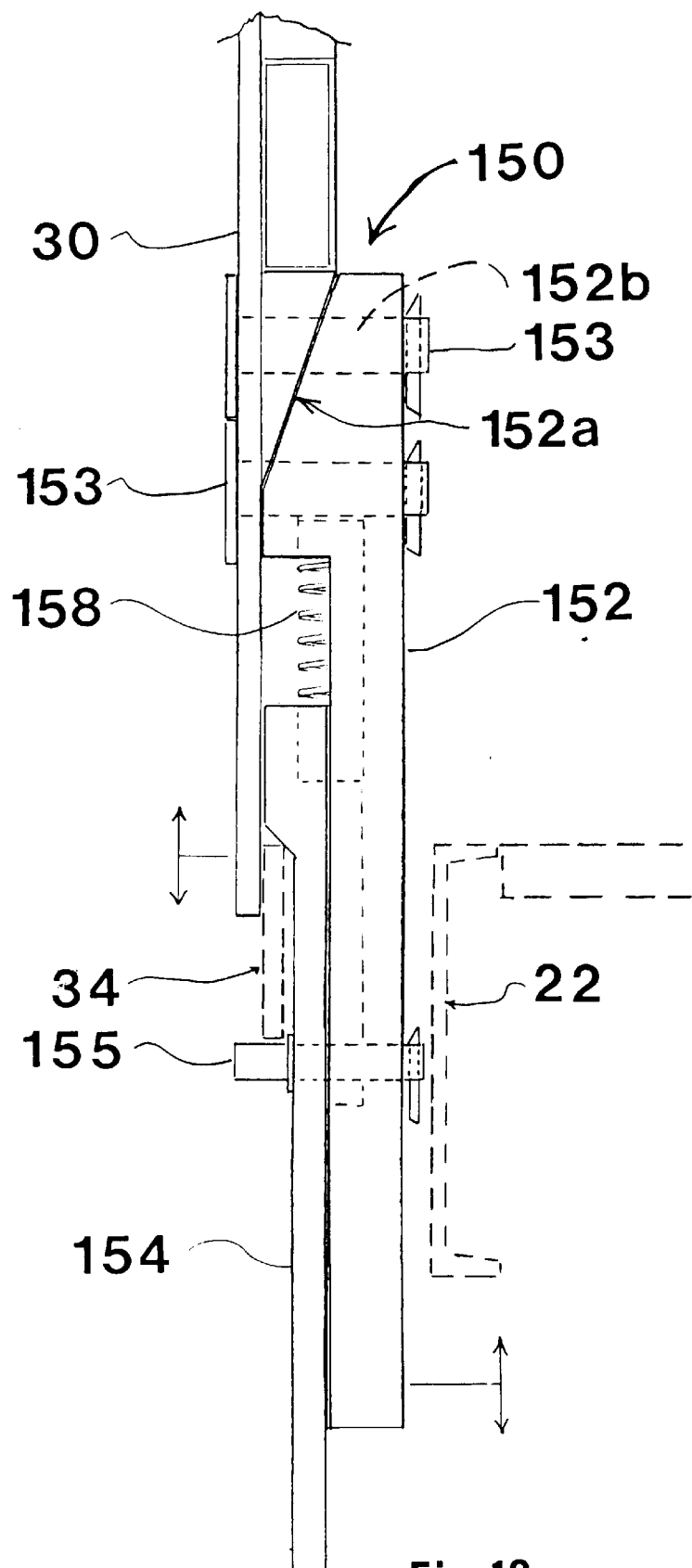
FIG. 19 is a side view of the portion shown in FIG. 16.

In use, the coupling member 150 is assembled with the cover 10 by fastening the first segment to the lower skirt portion and the second segment to the rub rail in the manner shown in FIG. 19. In this case, forces being exerted on the cover 10 may cause the first segment to move relative to the second segment, thereby causing the removable pins to move along the corresponding slots and the spring to be compressed, the greater the forces, the greater the relative movement between the first and second segments.

Thus, the independently self adjusting individual coupling members 150 have two interlocking mating portions and a spring captured therein. The coupling members allow the cover a range of vertical movement, limited upwardly by the tension lock steel pin 42, that is as it engages the lower boundary of the slot 152c, and downwardly by the compressing of the spring.

The coupling members are particularly beneficial because they are independently self adjusting and, as such, are able to accommodate the inherent resiliency of the cover by allowing some limited movement between the cover and the flat deck. These self adjusting coupling members may be used to couple the cover to the flat deck along two opposed regions of the cover, that is for example, a region bounded by one end of the cover and a distance of, say, one third of the length of the cover inwardly toward its central region. Two such regions are shown by A and B in FIG. 1.

The self adjusting coupling members offer a counter effect to off axis motion and movement typically seen in the structure of a trailer under load, to accommodate, among other things, lateral flexure or twisting along the longitudinal axis or the lateral axis of the flat deck as it moves along a road surface or over such obstacles as curbs, speed bumps and rail road tracks, or for that matter as can occur under some 'no load' conditions.

The self adjusting coupling members thus provide for confined movement of the lower skirt portion relative to the rub rail in the regions near the ends of the lower skirt. If desired, the self adjusting coupling members may be used with more rigidly fixed coupling members, such as those discussed herein above, which are positioned in the central area of the cover. Alternatively the self adjusting coupling members may be used exclusively instead of the coupling members above described. This will depend, on the extent of relative movement desired between the cover and the flat deck.

The first and second segments can be cushioned by a number of different components such as compression springs as mentioned above, as well as other compression members such as foams, hydraulic and pneumatic cylinders, gels and other materials which are capable with being resiliently deformed.

Thus, the present invention provides a cover which can be installed on a wide variety of semi-trailer vehicles such as flat deck trailers, including those with a preformed arch. The use of the coupling members allows the cover to adapt to specific dimensional variations between the trailers, including those with a preformed arch. In the latter case, the coupling members can be independently adjusted so that those in the central area of the cover extend to a lesser extent from the lower skirt portions than those in front and rear regions of the lower skirt portions.

Thus, one embodiment of the present invention provides a cover with a unitary structure that should fit a wide range of standard flat deck trailer configurations, including those referred to in the trucking industry as "high boy" and "low boy", without the need for alternations to the flat deck trailer itself.

Figures 20, 21:
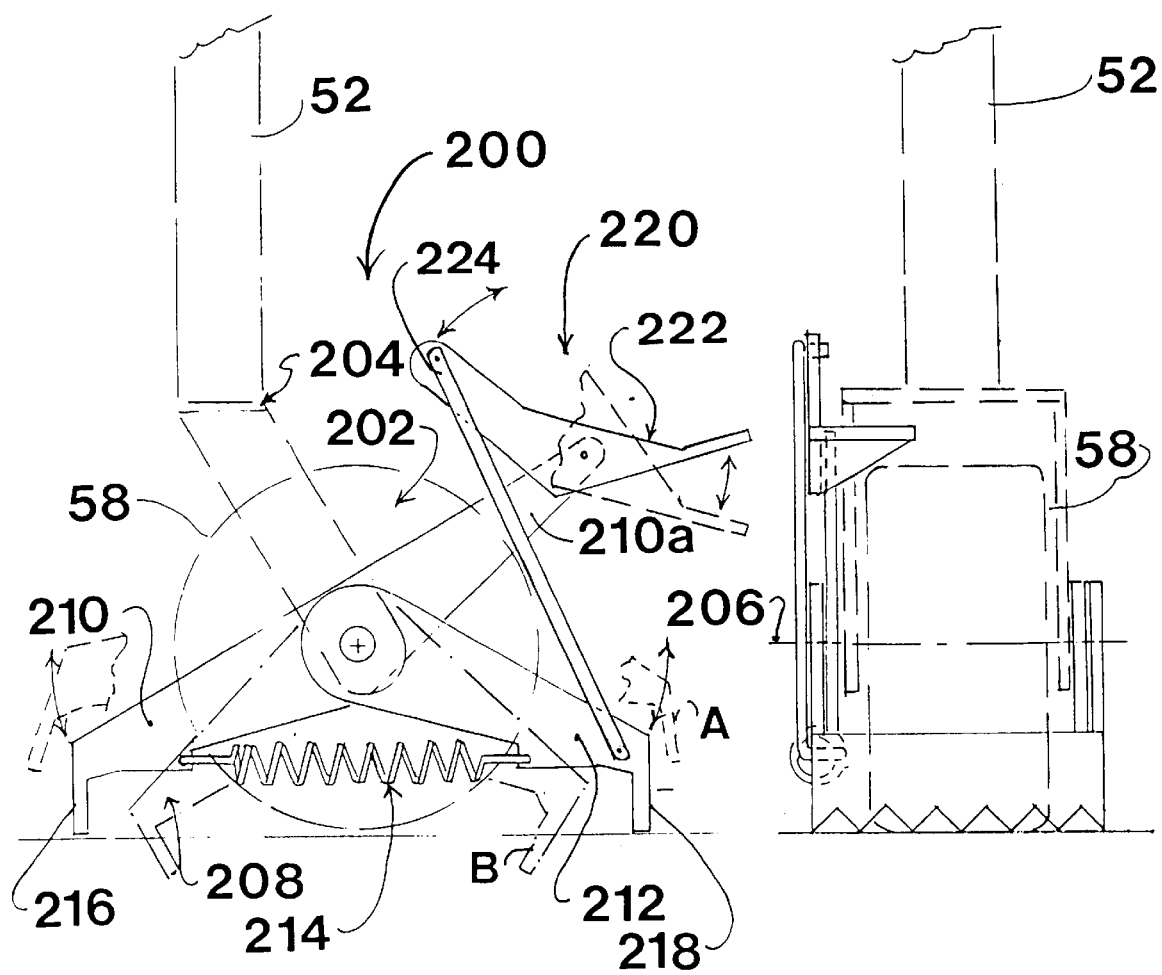
FIG. 20 is a side view of a portion of still another cover.
FIG. 21 is a front view of the portion shown in FIG. 20.

Another caster wheel assembly is shown at 200 in FIGS. 20 and 21. In this case, the assembly 200 has a wheel 202, axle means such as an axle pin (not shown) for mounting the wheel for rotation about a rolling axis, swivel frame means 204 for supporting the wheel for rotation about a swivel axis shown at 206 and ground engaging means shown generally at 208 for inhibiting displacement of the caster wheel assembly.

The ground engaging means 208 includes a first anchor member 210 pivotally coupled to the swivel frame means, a second anchor member 212 pivotally coupled to the swivel frame means and spring means 214 for biasing the first anchor member toward the second anchor member. The first and second anchor members each further include a remote end region 216, 218 for engaging a ground surface. Preferably, the remote end region has a gripping formation such as a saw toothed surface.

Preferably, the first and second anchor members extend outwardly of the wheel and in opposite directions. Each of the first and second anchor members are arranged to pivot relative to the rolling axis.

Further provided is a displacement means 220 for displacing the first and second anchor members between operative and inoperative positions. In this case, the first anchor member has an outer support portion 210a and the displacement means further includes a first displacement member 222 pivotally mounted to the outer support portion, and a second displacement member 224 joined between the first displacement member and the second anchor member, wherein travel of the first displacement member causes the first and second anchor members to be moved toward either the inoperative position or the operative position.

The caster wheel assembly 200 is positioned on the lower end of a leg arrangement such as that shown at 50 in an earlier embodiment. When the leg arrangement is in its storage position, the caster wheel assembly is thus in its inoperative position, that is not in contact with the ground surface. In this case, the spring 214 draws the first and second anchor members towards one another.

The caster wheel assembly 200 is thus displaced toward the ground surface when the caster jack motor is actuated, thereby lengthening the leg extension, finally bringing the wheel caster wheel assembly into contact with the ground surface. The first point of contact with the ground surface is the remote end regions of both the first and second anchor portions, which causes the remote end portions to penetrate the ground, the depth of the penetration depending on the hardness of the ground surface and the spring rate of the spring.

As weight is applied to the caster wheel, the anchor portions are spread apart to the position as shown in FIGS. 20 and 21, that is in their operative positions. It can be seen that in this position the anchor portions, with their ground griping formations, provide a solid engagement with the ground surface and act to inhibit any rolling displacement of the wheel 202 relative thereto.

The first and second anchor portions can be moved to their inoperative positions (as shown by the dashed lines at 'A') by the user downwardly displacing the first displacement member 222 which in turn causes both the first and second anchor members to be upwardly displaced, the latter by way of the second displacement member 224. If the user wishes to reapply the anchor portions, he need merely return the first displacement member 222 to its position as shown in FIG. 20.

Thus, when the caster wheel assembly is not in contact with the ground surface, the anchor portions may be arranged so that they are in a 'relaxed' position below the contact point of the wheel and relatively nearer to one another (as shown in chain dotted lines at 'b') in comparison with the position shown in solid lines when the wheel is in contact with the ground surface. The benefit of this 'relaxed' position is that the spring can be relaxed, thereby increasing the life of the spring. In effect, this means that the anchor portions may 'float' with little or no tension on the spring. Alternatively, the anchor portions may be arranged to limit to travel between the inoperative position shown in dashed lines and the operative position as shown in solid lines. Thus, the caster assembly 200 will enhance the leg arrangements, by improving their grip of the ground surface as well as to increase the surface area on which the force of the each leg arrangement will be applied, which should, in some cases, lower the pressure being exerted on a ground surface.

While the first and second anchor portions disclosed herein above are arranged to penetrate the ground they may instead be arranged to engage the ground surface, such as by way of suitably sized pads shown as a lateral extension of the anchor portions at 216a, 218a. This will of course depend on the area of each of the pads and the softness of the ground beneath.

While the caster wheel assembly 200 is discussed in the context of a leg arrangement making use of a caster jack as shown herein above, it should be recognized that the caster wheel assembly may be equally applicable to other uses outside that of a cover as used herein above.

While the above described cover is used in connection with a flat deck trailer, it should be recognized that the cover may be used for other trailer configurations including drop deck trailers, and multiple trailer configurations referred to in the trucking industry as 'A Trains, B Trains and C Trains'. In this case of drop deck trailers, the cover should have a length that would be equal to the length of the intermediate cargo supporting area of the trailer, that is between the rear wheel assembly area and the front fifth wheel interconnection area. Some of these trailers may not have a rub rail in place, in which case, other forms of coupling means may be used for removably coupling each of the longitudinal free edge regions of the side walls of the cover to a corresponding longitudinal edge region of the trailer.

While the above cover makes use of independently adjustable coupling members, it will be understood that the coupling members need not necessarily be independently adjustable but rather can be collectively mounted directly to one or more lower skirt portions. In this case, the skirt portion may, if desired, be adjustably mounted to the side wall portion.

It will be understood that a number of materials may be utilized in the fabrication of the various components of the covers described herein above, for example, the materials discussed in connection with the frame sub-assembly, the interior and exterior skins and the like in connection with the roof and side walls, as well as the skirt and the coupling members used therewith. These components may also be assembled using a number of well known techniques such as for example, welding, bonding or mechanical fastening, depending of course on the materials selected.

The frame sub-assembly, for example, can be made from one or a number of materials such as aluminum, steel, or a range of appropriate polymeric materials, as outlined above, including the higher molecular weight engineering plastics such as those referred to as UHMW (ultra high molecular weight) plastics, as well as composite materials including fibre composites including glass and carbon fibre composites.

The interior and exterior faces of each of the roof and side walls may be from, either alone or in combination, aluminum, steel, or various polymeric materials as outlined above, including the higher molecular weight engineering plastics such as those referred to as UHMW (ultra high molecular weight) plastics, as well as composite materials including fibre composites including glass and carbon fibre composites.

The skirt and the coupling members, for example, can also be made from, either alone or in combination, aluminum materials such as aluminum or steel, in extrusion or plate form, polymeric materials such as polyethylene and phenolic resins which may be available in a range of molecular weights, such as the higher molecular weight engineering plastics such as those referred to as UHMW (ultra high molecular weight) plastics, as well as composite materials including fibre composites including class and carbon fibre composites.

The materials selected for these component may depend, to a large extent, on the manufacturing facilities available as well as the operating specifications of the cover itself. For example, the polymeric materials have the advantage of being relatively light and durable, which makes polymeric material especially useful for the coupling members, allowing the coupling members to provide a point of flexure between the flat deck and the cover.

While the above cover provides for tight engagement of the lower skirt portion with the outer face of the rub rail, the cover may if desired be coupled to the flat deck trailer by other forms of rails or other means to couple the longitudinal free edge region of each side wall to a corresponding longitudinal edge region on the flat deck. In addition shock absorbing members or similar components may be incorporated into the coupling means to minimize vibrations between the cover and the flat deck.

What is claimed is:

1. A cover for a semi-trailer vehicle having a cargo support surface bordered by a pair of longitudinal edge regions, said cover comprising a roof and a pair of side walls forming a cargo receiving passage there between; each of said pair of side walls terminating at a longitudinal free edge region to expose said cargo receiving passage to said cargo support surface, and coupling means for removably coupling each of said longitudinal free edge regions to a corresponding longitudinal edge region.

2. A cover as defined in claim 1 wherein each of said longitudinal edge regions includes a longitudinal rail member and a plurality of passages adjacent said rail member, said coupling means including a plurality of coupling members, each of which is dimensioned to extend through a corresponding passage.

3. A cover as defined in claim 2 wherein each of said coupling members includes a first segment anchored to said cover and a second segment anchored relative to said longitudinal rail member, said segments being arranged for limited movement there between.

4. A cover as defined in claim 3 wherein said first segment is slidably engaged with said second segment.

5. A cover as defined in claim 4 wherein said first segment has a plurality of first passages formed therein for anchoring said first segment with said cover.

6. A cover as defined in claim 5 wherein said second segment has a plurality of second passages for anchoring said second segment relative to said longitudinal rail member.

7. A cover as defined in claim 6 wherein said first segment further comprises a plurality of slots, each of said slots being aligned with a corresponding one of said second passages, in order to receive a fastener therein.

8. A cover as defined in claim 3 further comprising biasing means positioned between said first and second segments.

9. A cover as defined in claim 8 wherein said aligned passages together with said fastener forms a first limit of relative travel between said first and second segments, said cover further comprising biasing means positioned between said first and second segments, wherein said biasing means forms a second limit of relative travel between said first and second segments.

* * * * *